United States Patent
Busch et al.

(10) Patent No.: US 8,609,176 B2
(45) Date of Patent: Dec. 17, 2013

(54) FOOD COMPOSITION

(75) Inventors: Johanna Louise Busch, Vlaardingen (NL); Jacoba Anna Maria Keulemans, Vlaardingen (NL); Gerrit Jan van den Oever, Vlaardingen (NL); Freek Reckweg, Heilbronn (NL)

(73) Assignee: Conopco Inc., Englewood Cliffs, NJ (US)

( * ) Notice: Subject to any disclaimer, the term of this patent is extended or adjusted under 35 U.S.C. 154(b) by 424 days.

(21) Appl. No.: 12/519,793

(22) PCT Filed: Nov. 29, 2007

(86) PCT No.: PCT/EP2007/062981
§ 371 (c)(1),
(2), (4) Date: Jun. 19, 2009

(87) PCT Pub. No.: WO2008/074606
PCT Pub. Date: Jun. 26, 2008

(65) Prior Publication Data
US 2010/0104733 A1    Apr. 29, 2010

(30) Foreign Application Priority Data
Dec. 21, 2006 (EP) .................................... 06126851

(51) Int. Cl.
*A23L 1/237* (2006.01)
(52) U.S. Cl.
USPC ............ 426/649; 426/589; 426/804; 426/806
(58) Field of Classification Search
USPC .................. 426/506, 589, 648, 649, 804, 806
See application file for complete search history.

(56) References Cited

U.S. PATENT DOCUMENTS

| | | | | |
|---|---|---|---|---|
| 3,493,400 A | * | 2/1970 | Truckenbrodt et al. | 426/640 |
| 4,946,693 A | * | 8/1990 | Risler et al. | 426/243 |
| 5,232,732 A | | 8/1993 | Harris et al. | |
| 6,159,529 A | * | 12/2000 | Uchida et al. | 426/649 |
| 2006/0088649 A1 | | 4/2006 | Ganesan et al. | |

FOREIGN PATENT DOCUMENTS

| | | |
|---|---|---|
| GB | 917 324 A | 2/1963 |
| JP | 58 190379 A | 11/1983 |
| JP | 2002 247961 A | 9/2002 |

OTHER PUBLICATIONS

European Search Report EP 06 12 6851 dated Apr. 26, 2007, 2 pp.
International Search Report PCT/EP2007/062981, mailed Feb. 20, 2008, 3 pp.

* cited by examiner

*Primary Examiner* — Leslie Wong
(74) *Attorney, Agent, or Firm* — Alan A. Bornstein

(57) ABSTRACT

A food composition is provided useful for decreasing the amount of sodium while maintaining a high perceived saltiness of the food composition. The food composition comprises a particulate phase and a soluble phase and a selective sodium distribution between the phases whereby the amount of sodium in the particulate phase is at least 4 wt %, more preferably at least 10 wt %, more preferably at least 15 wt % and most preferably at least 20 wt %, and preferably at most 99.99 wt %, more preferably at most 99 wt %, more preferably at most 90 wt %, most preferably at most 70 wt % by weight of the total amount of sodium in the particulate and soluble phase.

5 Claims, No Drawings

FOOD COMPOSITION

This application is a 371 of PCT/EP07/62981 filed Nov. 29, 2007.

The present invention relates to a food composition, more in particular a food composition with reduced sodium content and a process for reducing the sodium content in a food composition.

BACKGROUND OF THE INVENTION

Sodium chloride is an important ingredient in many food products. However the average intake of sodium, especially in developed countries, is more than is physiologically needed. Excess intake of sodium has been related to hypertension. Hypertension in turn is correlated with other cardiovascular diseases and together they form a major health problem in developed countries.

Levels of sodium chloride are especially high in processed food products and many efforts have been made to reduce the levels of sodium chloride. For example, potassium chloride has been suggested to replace sodium chloride. However, potassium chloride tastes less salty and may be more importantly also imparts a bitter and metallic taste. Mixtures of different salts like ammonium chloride and magnesium chloride have also been disclosed as salt replacer formulations. However the disclosed formulations all seem to suffer from insufficient saltiness, off tastes, more complex processing, increased cost and limited applicability.

Unexpectedly, the present invention provides a food composition that overcomes one or more of the drawbacks mentioned above.

SUMMARY OF THE INVENTION

The present invention surprisingly provides a process to reduce sodium levels in food compositions while maintaining a good perceived saltiness by selectively distributing the amount of sodium in said food composition and food compositions prepared using the same.

According to the first aspect of the invention a food composition comprising a particulate phase and a soluble phase and a selective sodium distribution between said phases whereby the amount of sodium in the particulate phase is at least 4 wt %, more preferably at least 10 wt %, more preferably at least 15 wt % and most preferably at least 20 wt %, and preferably at most 99.99 wt %, more preferably at most 99 wt %, more preferably at most 90 wt %, most preferably at most 70 wt % by weight of the total amount of sodium in the particulate and soluble phase. Surprisingly, this aspect of the invention provides food compositions with reduced sodium levels while maintaining the same perceived saltiness compared to same food composition with normal sodium levels. The experiments show that at least about 15% sodium reduction can be achieved without changing the perceived saltiness.

According to a second aspect of the invention a process is provided for reducing the sodium level in a food composition while maintaining the perceived saltiness whereby said food composition comprises an insoluble particulate phase and a soluble phase, said process comprising the step of selectively distributing the total amount of sodium in the food composition between said phases such that the amount of sodium in the particulate phase is at least 4 wt %, more preferably at least 10 wt %, more preferably at least 15 wt % and most preferably at least 20 wt %, and preferably at most 99.99 wt %, more preferably at most 99 wt %, more preferably at most 90 wt %, most preferably at most 70 wt % by weight of the total amount of sodium in the particulate and soluble phase.

According to another aspect of the invention an instant food composition is provided that is obtainable according to said process.

Many salt reducing compounds described in the prior art require additional agents to mask or conceal off tastes of the salt reducing compound. Consumers are increasingly concerned about additives in food products. One of the advantages of the present invention is that it provides food compositions which do not need such additional agents.

DETAILED DESCRIPTION OF THE INVENTION

The food composition is preferably an instant food composition comprising the selective sodium distribution whereby the amount of sodium in the particulate phase is at least 4 wt %, more preferably at least 10 wt %, more preferably at least 15 wt % and most preferably at least 20 wt %, and preferably at most 99.99 wt %, more preferably at most 99 wt %, more preferably at most 90 wt %, most preferably at most 70 wt % by weight of the total amount of sodium in the instant food composition. An instant food composition for the present purpose is meant to describe a food composition which is sold as a dry product to which an aqueous medium (usually water) is added before consumption. When the ready to eat composition is consumed hot, heat may be applied after the addition of water. Alternatively, hot water may be added such as in the case of some instant soups. Examples of instant food compositions include instant soup, sauce, beverage and dressings.

An instant food composition for the present purpose may comprise at least a 0.01 wt %, more preferably at least 0.1 wt %, most preferably at least 1 wt % but less than 15 wt %, more preferably less than 10 wt %, most preferably less than 5 wt % of water (bound and free) by weight of the instant food composition. For the sake of clarity it is noted that the amount of the ingredients of the instant food composition is expressed as weight percentage of the total instant food composition, unless otherwise noted. The term "ready-to-eat food composition" will be used to describe the instant food composition after it has been prepared with the required amount of liquid. One especially preferred example includes an instant soup composition which normally comprises of a dry mixture of bouillon powder, salt, and flavouring agents like herbs and spices, pieces of vegetable and protein.

The amount of sodium in the instant food composition is preferably at least a 0.1 wt %, more preferably at least 1 wt %, most preferably at least 2 wt % but less than 50 wt %, more preferably less than 25 wt %, most preferably less than 10 wt % by weight of the total instant food composition.

To reach an even lower amount of total sodium in the instant food composition, sodium replacing compositions may still be used in the present invention. Sodium replacing compositions have been developed to replace sodium in food composition by providing a salty taste while no or less sodium is used. Examples include sodium replacing compositions comprising potassium and other compounds such as amino acids and organic acids, trehalose, salts of magnesium, and ammonium. Thus according to one preferred embodiment, the instant food composition comprises an effective amount of a sodium replacing composition. Preferably part of the sodium in the soluble phase, the particulate phase or indeed both phases is replaced by an effective amount of a sodium replacing composition. An effective amount is an amount sufficient to replace part of the sodium while maintaining or increasing the saltiness.

The amount of sodium may be introduced in the particulate phase in any means known to the skilled person. For example, the particles such as pieces of protein or vegetable may be salted or marinated in a sodium containing solution until the desired amount of sodium has been reached. One preferred example comprises heating the particulate phase in a sodium containing solution. The particles may be dried by any means known to the person skilled in the art such as freeze drying or subjecting to heat, air or both.

According to another embodiment, an instant food composition may comprise sodium whereby the weight ratio of the sodium [particulate phase:soluble phase] is at least 5:95, more preferably to at least 10:90, more preferably to at least 15:85 and most preferably to at least 20:80, and preferably said ratio is at most 99.9:0,1 more preferably at most 90:10, most preferably at most 70:30.

For the purpose of the present invention, the particles in the particulate phase are meant to describe pieces which do not dissolve in an aqueous medium added to the instant food composition, but typically remain clearly discernable as particles when the ready-to-eat food composition is consumed and usually need to be chewed before ingestion. For the purpose of this invention the terms "particle" and "piece" are used interchangeably. In an instant soup the particulate phase may comprise pieces of pasta, vegetable or protein. The pieces of protein may be of any suitable source. Preferred protein sources included vegetable, fungal, animal and mixtures thereof. For example in instant chicken soup the particulate phase typically includes dehydrated pieces of chicken meat. In other applications, pieces of meat of varying origin may be used such a beef or pork. The particles in the particulate phase may have any form. Generally, the particles in the particulate phase will have a more or less rectangular or spherical form. Preferably, said particle in the particulate phase will have a volume of more than 1 $mm^3$, preferably more than 8 $mm^3$, more preferably more than 27 $mm^3$, most preferably more than 64 $mm^3$, but less than 8000 $mm^3$, preferably less than 4000 $mm^4$, more preferably less than 750 $mm^3$. Preferably at least 10%, more preferably at least 25%, most preferably at least 45% and preferably at most 100%, more preferably at most 90% and most preferably at most 80% of the number of said particles in the particulate phase have a volume as described above. The volume of the particulate phase as a whole can be determined by the sum of the volumes of the individual particles The particle in the particulate phase is preferably not encapsulated such that after an aqueous medium has been added at least some of soluble flavour ingredients may diffuse into the aqueous medium.

Preferably, the particle in the particulate phase will have a weight of more than 0.01 g, preferably more than 0.05 g but less than 10 g, preferably less than 5 g, more preferably less than 1 g.

The particles in the particulate phase may comprise of a non-soluble part and a soluble part. For example, if the particulate phase comprised pieces of chicken meat, these pieces may be flavoured with soluble flavouring agents and salted. The soluble part typically comprises the sodium and other soluble compounds. To calculate the selective sodium distribution of an instant food composition the amount of sodium of the soluble phase and soluble part of the particulate phase are used.

It will be clear that different sources may be used to prepare the pieces. If at least some of the pieces comprise protein, the protein source is preferably selected from the group consisting of meat, egg, fungal protein, vegetable protein and mixtures thereof. For the purpose of this invention meat is defined as tissue of any organism suitable for human consumption. Preferred examples include muscle and organ tissue of fowl (like chicken and turkey), cow, pig, horse, fish and crustaceans (like crab, shellfish, and lobster). The pieces may be simply pieces of dried vegetables, pieces of dried meat and mixtures thereof. Processed meats as sausages may also be used as a basis for preparing pieces. Alternatively, vegetarian meat alternatives may also used such as fungal protein, egg white protein, egg yolk protein, vegetable protein and mixtures thereof. Examples of vegetable protein include soy protein and wheat protein. Thus, according to one preferred embodiment, said particulate phase comprises pieces selected from the group consisting of pasta, vegetable, meat, egg, fungal protein, vegetable protein and mixtures thereof. In addition to or instead of pieces comprising a protein, at least some of the particulate phase may comprises one or more vegetables such as pieces of vegetable like celery, carrot, mushroom, pea, leek, bell pepper may be used, either alone or in any combination thereof. Preferably, the particulate phase comprises edible pieces selected from chicken, tofu, bacon, beef, fish, prawn, processed fungal protein, wheat protein, cellulose, onion, carrot, pea, leek, bell pepper and mixtures thereof. In some preferred embodiments, the particulate phase does not comprise pork and/or cheese. The term processed fungal protein is meant to describe pieces whereby fungal protein is mixed with other ingredients.

The amount of the particulate phase in the total instant food composition may be adjusted depending on the application. Typically, the amount of the particulate phase in the total instant food composition is at least a 0.1 wt %, more preferably at least 1 wt %, most preferably at least 10 wt % but less than 90 wt %, more preferably less than 75 wt %, most preferably less than 50 wt % by weight of the total instant food composition.

The soluble phase further may comprises one or more ingredients selected from at least one fat, at least one binder, at least one flavoring agent and mixtures thereof. When an aqueous medium is added to the instant food composition, the soluble phase typically dissolves or in the case of fat and finely ground herbs and spices is solubilised. Although, in some cases fat, herbs and spices may be dispersed rather than solubilised for the purpose of the present invention herbs, spices and fat are considered to be part of the soluble phase and not of the particulate phase as these ingredients usually need not be chewed before consumption. Typical flavouring agents include mono sodium glutamate, 5' ribonuclueotides, chicken flavour, chicken extract, yeast extract, onion powder, soy sauce flavour, lemon juice powder, garlic flavour, lactose and mixtures thereof. Some herbs and spices may be present such as ground pepper. Chicken flavour and other flavours can be obtained from flavour suppliers like Firmenich, IFF, Givaudan and Quest Int.

For many applications the soluble phase and/or the particulate phase of the instant food composition may comprise fat. For example, for a chicken soup chicken fat may be used. If the soluble phase comprises a fat, it preferably comprises at least 0.01 wt %, more preferably at least 0.5 wt %, most preferably at least 1 wt % but less than 50 wt %, more preferably less than 25 wt %, most preferably less than 10 wt % of fat by weight of the instant food composition. These ranges may also be employed in the particulate phase. The term "fat" for the present purpose is intended to include any triglyceride or mixture of triglycerides suitable for use in food compositions. Some examples include chicken fat, beef tallow, palm oil, sunflower oil, soy oil, linseed oil, rapeseed oil, olive oil, coconut oil and mixtures thereof.

When the instant food composition comprises a binder, any binder may be used to thicken the food composition. The binder is preferably selected from starch, maltodextrin, creamer and mixtures thereof. The starch may be from any suitable source such as potato or corn. The starch may be an unmodified starch, modified starch or mixtures thereof. When the instant food composition comprises a binder the binder may be present at least 5 wt %, more preferably at least 10 wt %, most preferably at least 15 wt %, but less than 95 wt %, more preferably less than 90 wt %, most preferably less than 80 wt % of binder by weight of the instant food composition.

According to a second aspect of the invention a process is provided for reducing the sodium level in a food composition while maintaining the perceived saltiness whereby said food composition comprises an insoluble particulate phase and a soluble phase, said process comprising the step of selectively distributing the total amount of sodium in the food composition between said phases such that the amount of sodium in the particulate phase is at least 4 wt % more preferably at least 10 wt %, more preferably at least 15 wt % and most preferably at least 20 wt %, and preferably at most 99.99 wt %, more preferably at most 99 wt %, more preferably at most 90 wt %, most preferably at most 70 wt % by weight of the total amount of sodium in the particulate and soluble phase. According to another aspect of the invention an instant food composition is provided obtainable according to said process. The results show that a reduction of sodium of at least 15 wt % can be achieved without using additives or compromising the level of perceived saltiness.

The instant food composition may be used to prepare a ready to eat composition such as a sauce, soup, beverage or a dressing. Typically the instant food composition will be a dry granulate to which aqueous medium such as water is added before consumption. When the ready to eat composition is consumed cold, usually cold water is added. When the final composition is consumed hot, the instant food composition is generally mixed with hot water. Alternatively, it may be mixed with cold water whereafter the mixture is heated by any means such as microwave or a stove. The amount of aqueous medium depends on the composition of the instant food composition. Generally, the skilled person in the art will formulate the instant food composition and advise the consumer of the amount of aqueous medium to be used based on the flavour profile the skilled person intends for the read to eat composition Thus, according to another aspect of the invention a process for preparing a ready to eat food composition is provided comprising the steps of mixing an instant food composition as described above with hot or cold water such that the resultant mixture is a ready to eat food composition having an amount of sodium of at least 0.1 wt %, more preferably at least 0.2 wt % and preferably less than 2 wt % more preferably less than 1 wt by weight of the ready to eat food composition. According to yet another aspect of the invention a ready to eat food composition is provided obtainable according to such process. Per 100 g of instant food product, preferably at least 500, more preferably at least 600, most preferably at least 800 ml of aqueous medium is used and preferably less than 10 000 ml, more preferably less than 5000 ml.

EXAMPLES

Three instant soup compositions were prepared by mixing the ingredients as shown in table 1. The particulate phase consisted of dehydrated pieces of chicken (average weight of a particle 0.1 g, 6×6×6 mm), which were prepared from chicken meat and were salted with sodium chloride to contained the levels of sodium as shown in table 1. The instant soup composition had different sodium levels with different distribution of sodium between the particulate phase and the soluble phase.

Soup A (Control)

Soup B, whereby the total level of sodium is reduced about 15% compared to Soup A, with a distribution of sodium similar to soup A Soup C, whereby the total level of sodium is reduced about 15% compared to Soup A, but with a distribution of sodium according to the invention.

TABLE 1

| Instant food product | Soup A (wt %) | Soup B (wt %) | Soup C (wt %) (according to the invention) |
|---|---|---|---|
| Particulate phase | | | |
| pieces of chicken meat | 32 | 33 | 33 (high sodium) |
| Soluble phase | | | |
| Corn starch (binder) | 25 | 25 | 25 |
| Maltodextrin (binder) | 5 | 5 | 5 |
| Pea starch (binder) | 0.2 | 0.2 | 0.2 |
| Chicken fat | 4 | 4 | 4 |
| MSG | 2 | 2 | 2 |
| Chicken flavour 1 | 0.4 | 0.4 | 0.4 |
| Chicken powder | 1 | 1 | 1 |
| Chicken flavour 2 | 2 | 2 | 2 |
| Yeast extract | 1.5 | 1.5 | 1.5 |
| Creamer | 11 | 11 | 11 |
| Citric acid | 0.05 | 0.05 | 0.05 |
| Other flavouring agents (including sodium chloride) | Up to 100 wt % | Up to 100 wt % | Up to 100 wt % |
| Selective sodium distribution | | | |
| grams of Na in the soluble phase | 3.5 | 3.0 | 2.1 |
| grams of Na in the particulate phase | 0.1 | 0.1 | 1.0 |
| Total Na content (g) | 3.6 | 3.1 | 3.1 |
| Na in particulate phase (wt % of total Na) | 2.7 | 3.2 | 32 |

Starting from the instant soup compositions A, B and C three ready to eat chicken soups were prepared by mixing 1.000 ml of water per 100 q instant soup compositions A, B and C as shown in table 1 and boiling the resultant mixture for 2 minutes whereby the pieces of chicken were added just before consumption (see table 1).

The soups were given to naïve people, who had to score the soup on saltiness. Saltiness scores were compared.

Description of Sensory Test 60 people naïve to the purpose of the test consumed two blind samples, one on each of the two consecutive days of the test.

Each participant was given two soups out of the three soups, one soup on each day. The following pairs were offered, according to a randomised offering design: A-C, A-B, B-A, C-A Each of the eight samples was given a 3 digit random code. 100 ml of the appropriate hot soup was added to a cup with the corresponding pieces and was immediately given to a respondent. The soup was consumed within 15 minutes.

The participants were given a questionnaire to fill in after eating the soup. The questionnaire was set up such that the key question (on saltiness) of the test were hidden among other questions, such as not to influence participants and direct their attention to saltiness. The main question of interest was on the salty taste of the composition, scored between 1 (not salty at all) and 10 (very salty).

Results

The scores on saltiness showed that of the two soups B and C that were reduced in sodium by about 15 wt %, the soup according to the invention (C) scored significantly higher on saltiness compared to soup B, while both soups B and C have the same sodium content, but differently distributed over the food the composition. No difference was tasted between Soup C (15% reduced in salt, according to the invention) and control soup A (no salt reduction).

Examples D and E

Examples D and E show two instant soup compositions according to the invention.

| Example D (950 ml hot water to be added to 100 g) | Wt % | Example E (600 ml hot water to be added to 100 g) | Wt % |
|---|---|---|---|
| Particulate phase | | Particulate phase | |
| Chicken pieces | 35 | Chicken pieces | 42 |
| Soluble phase | | Soluble phase | |
| Potato starch (binder) | 24 | Potato starch (binder) | 18 |
| Maltodextrin (binder) | 18 | Maltodextrin (binder) | 4 |
| Fat powder | 13 | Sugar | 8 |
| Palm oil | 1 | Palm oil | 1 |
| Sodium chloride | 4 | Sodium chloride | 4 |
| Chicken base | 1.4 | MSG | 2 |
| Onion powder | 0.6 | Onion powder | 3 |
| Broth base | 0.2 | Chicken powder | 1 |
| | | Semolina pasta | 7 |
| | | Pan cake pieces | 2 |
| | | Xanthan gum | 0.5 |
| | | Vegetables | 4 |
| Mix of flavors | 2.8 | Mix of flavors | 3.5 |
| Total | 100 | | 100 |
| Selective sodium distribution | | Selective sodium distribution | |
| grams of Na in the soluble phase | 2.0 | grams of Na in the soluble phase | 2.4 |
| grams of Na in the particulate phase | 0.9 | grams of Na in the particulate phase | 1.1 |
| Total Na content (g) | 2.9 | Total Na content (g) | 3.5 |
| Na in particulate phase (wt % of total Na) | 32 | Na in particulate phase (wt % of total Na) | 32 |

The invention claimed is:

1. A process for reducing the sodium level in a food composition while maintaining the perceived level of saltiness prior to the sodium reduction, said process comprising the step of selectively distributing the total amount of sodium in the food composition such that the amount of sodium in the particulate phase is in the range of 20 to 70 wt %; wherein said food composition comprises a particulate phase and a soluble phase and a selective sodium distribution between said phases; the amount of sodium in the particulate phase is at east 20 wt % and at most 70 wt % by weight of the total amount of sodium in the particulate and soluble phase, said particulate phase consisting of pieces selected from the group consisting of pasta, vegetable, meat, egg, fungal protein, vegetable protein, cellulose and mixtures thereof; the instant food composition comprises an effective amount of a sodium replacing composition to maintain the perceived level of saltiness while reducing the sodium content of the food composition by at least 15% by wt; said instant food composition comprises less than 10 wt % of water; and said pieces in the particulate phase is defined as a particulate having a volume of more than 1 mm$^3$.

2. the method of claim 1 wherein the soluble phase further comprises one or more ingredients selected from fat, herbs, spices, at least one binder, at least one flavoring agent and mixtures thereof.

3. The method of claim 1 wherein the instant food composition is an instant soup.

4. The method of claim 1 wherein the food composition comprises at least 0.1 wt % but less than 50 wt % of sodium by weight of the total food composition.

5. The method of claim 1 wherein the amount of the particulate phase in the total food composition is at least 0.1 wt % but less then 90 wt % by weight of the total food composition.

* * * * *